Patented Apr. 12, 1932

1,853,049

UNITED STATES PATENT OFFICE

KENNETH H. HOOVER, OF DEERFIELD, ILLINOIS, ASSIGNOR TO ASSOCIATION OF AMERICAN SOAP AND GLYCERINE PRODUCERS, INC., A CORPORATION OF DELAWARE

RESINOUS CONDENSATION PRODUCT

No Drawing. Application filed May 12, 1930. Serial No. 451,855.

The present invention relates to improvements in resinous condensation products or ester complexes derived from certain glycerol derivatives, and more particularly to resinous bodies of this type and to methods for their manufacture having marked advantages in production and in utilization.

In accordance with the present invention resinous ester bodies are produced which are particularly advantageous for use industrially, more especially in adhesives and protective films and as components of nitrocellulose lacquers. The resinous bodies produced in accordance with this invention may vary from soft, balsam-like resins to hard, tough resinous materials while retaining solubility in common organic solvents without requiring the use of modifying agents in their manufacture such as are commonly used to maintain the solubility of other types of synthetic resins. Furthermore, resinous bodies with very low acid numbers may be produced in accordance with the present invention; and their solutions have low viscosities, even without the use of modifying agents in their manufacture, and notwithstanding low acidity of the resins.

In operating in accordance with the present invention to produce such resins, there are no well defined critical heating periods such as are found ordinarily in synthesizing resinous bodies, wherein marked changes in the properties of the compounds are produced in very short periods of time, with resulting insolubility in common organic compounds and occasionally infusibility. Since such critical points in the manufacturing process are not present in operating in accordance with the present invention, this process is particularly adapted to large scale industrial manufacture and has the further advantage that reproduction of properties of the product from batch to batch is greatly facilitated.

In accordance with the present invention, esterifiable ethers of glycerol and a cyclic compound are condensed with polybasic carboxylic acids to form resinous ester bodies. The term "esterifiable ethers of glycerol" in this specification designates the mono and di-ethers of glycerol, since the tri-ethers of glycerol are incapable of esterification unless hydroxyl substitutions occur in the ether radicals. In accordance with this invention, the glycerol ethers of this character are employed; that is, aromatic and heterocyclic mono- and di-ethers of glycerol wherein the glycerol residue constitutes one radical and another ether radical is an aromatic or heterocyclic residue, substituted or unsubstituted. Ordinarily it is desirable to use only a mono-ether of glycerol in preparing resinous bodies in accordance with this invention; but, in certain cases, as where a softer resin is desired, it may be produced by utilizing a suitable proportion of a di-ether of glcerol with the mono-ether. Compound ethers, that is, glycerol di-ethers having dissimilar ether radicals, one or both of which are cyclic, are included in operating in accordance with the present invention, as well as are mixtures of two or more glycerol ethers. Thus, I may employ such ethers as the benzyl, hydroxyphenyl, carboxyphenyl, cresyl, furfuryl, chlorophenyl and naphthyl ethers of glycerol, or compound ethers thereof.

The esterifiable glycerol ether of a cyclic body is caused to react with a polybasic carboxylic acid or its anhydride such as phthalic, succinic, maleic, and adipic acid or the anhydrides of one of them, or mixtures thereof. Ordinarily, for economic reasons, phthalic anhydride is preferred. Molecular proportions of the reacting bodies are preferably, but not necessarily employed.

The esterifiable ethers of glycerol and a cyclic body are caused to react with a polybasic carboxylic acid compound preferably by heating, to secure the desired condensation and formation of a resinous condensation product of such ether of glycerol and the polybasic acid; and the heating is continued until a resinous body having the desired properties with respect to acid number or hardness is secured. Resinous bodies having acid numbers of 25 or less may be produced which are soluble in the usual lacquer solvents. On continuing the reduction of the acid numbers, say to 10 or less by continued heating, the resins remain clear, soluble in the solvent mixture of esters, alcohols and hydrocarbons commonly used in lacquers and compatible with nitrocellulose. By employing different ethers and different acids, a considerable variation in characteristics may be secured, the process and the resulting bodies having the general properties hereinbefore set forth. The following examples are illustrative of the invention.

*Example 1*

420 parts of α-glyceryl phenyl ether ($CH_2OH.CHOH.CH_2OC_6H_5$) and 370 parts of phthalic anhydride are charged into an open reaction vessel which may be made suitably of aluminum or may be glass lined. The charge is heated to 220–225° C. during the course of 2–3 hours, such heating being accomplished by raising the temperature rapidly at first to approximately 175° C. as for example during the first 1–1½ hours and then gradually to 220–225° C. during the last 1–1½ hours of this initial heating period. During this period of heating, volatilization of the reacting constituents is prevented, at least in part, as by a reflux condenser or a vented cover.

When the reaction temperature has reached 220–225° C., heating is continued within this range of temperatures with the vessel open until a 1–2 gram test sample of the batch dissolved in 50 cc. of a mixture of equal parts by volume ethanol and benzene, and titrated with N/10 potassium hydroxide solution, using phenolphthalein as indicator, has an acid number of 10 or less (mgm. KOH per gm.). This time of heating at 220–225° C. necessary to carry the reaction to this specific point, i. e., a resin having an acid number of 10 or less, will depend upon several factors such as the physical characteristics of the vessel and the batch size, which in turn will determine the relation of surface area of the batch exposed and heated surface to its total volume. During the early stages of the reaction the volatile products given off consist largely of water vapor, accompanied by small quantities of the reactants themselves. During the later stages of the reaction water is still given off but substantial quantities of phthalic anhydride are likewise volatilized. The time of heating at 220–225° C. should normally not exceed 8–10 hours in producing a resin having an acid number of 10 or less. The rate of decrease of the acidity of the resin becomes increasingly slower as the resin approaches neutrality. 5–6 hours heating at 220–225° C. should normally suffice under the same conditions to reduce the acid number to 25 or less.

Various expedients well known to the resin art may be employed to increase the rate of reaction and/or reduction of said acid numbers. For example, the reaction may be carried out in a closable vessel under reduced pressures during the reaction or an inert gas may be passed through the reaction mixture to hasten the removal of volatile products of the reaction. The latter expedient also has the advantage of producing resins of better color, as it provides a non-oxidizing atmosphere for the reaction.

In the production of large batches of the resin, particularly when heated by direct flame, agitation of the reaction mixture may be employed to advantage to prevent local over-heating in the charge and to hasten the reaction.

The finished resin having an acid number of 10 or less is a hard clear resin having a brownish-red color. It is soluble in organic esters and aromatic hydrocarbons and in mixtures of esters, alcohols and hydrocarbons such as are ordinarily used in lacquer compositions. It is compatible with nitrocellulose in all proportions in the lacquers as ordinarily formulated.

If the condensation has been carried only through the shorter heating period the resin having an acid number approximating 25 will be somewhat softer and will have a lighter color but otherwise will exhibit substantially the same properties as the resin of lower acidity.

*Example 2*

112 parts by weight of the tetrahydrofurfuryl ether of glycerol,

and 96 parts of phthalic anhydride are charged to a suitable container of aluminum or glass lined material. The charge is heated in the manner set forth in Example 1 to effect the desired condensation and secure a product of the desired acid number.

The finished resin having an acid number of approximately 10 is a soft, clear resin, dark brown in color. It is soluble in acetone, a mixture of alcohol and benzene and in mixtures of esters, alcohols and hydrocarbons such as are ordinarily used in formulating lacquers. It is compatible with nitrocellulose in such lacquers.

The following additional examples illustrate the invention further:

366 parts of α-glyceryl phenyl ether

157 parts of αα′-glyceryl diphenyl ether

and 370 parts of phthalic anhydride are condensed as in the preceding examples, yielding a resin somewhat softer than the resin prepared from α-glyceryl phenyl ether and phthalic anhydride but otherwise exhibiting similar properties.

168 parts of α-glyceryl phenyl ether and 118 parts of succinic acid are condensed in accordance with this invention, yielding a reddish-brown resin of lighter color, softer and somewhat more elastic than the α-glyceryl phenyl ether-phthalic anhydride resin. It is soluble in toluene and butyl acetate and in the usual lacquer solvent mixtures.

202.5 parts of α-glyceryl ortho chlorophenyl ether.

$$(CH_2OH.CHOH.CH_2OC_6H_4Cl)$$

and 148 parts of phthalic anhydride are condensed as hereinbefore described and yield a resin exhibiting substantially the same physical properties and the same solubilities as the α-glyceryl phenyl ether-phthalic anhydride resin.

It has been customary hitherto to use modifying agents in synthetic resin manufacture. These modifying agents may be employed with resins produced in accordance with the present invention. Most important among these modifying agents are polyhydric alcohols such as ethylene glycol and glycerol; monobasic carboxylic acids such as oleic, linoleic, and abietic acids; oils, drying or non-drying, such as linseed and castor oils; and natural resins such as rosin.

Previously the use of modifying agents, other than the polyhydric alcohols, has been largely for the modification of resins otherwise insoluble in the ordinary organic solvents or for the reduction of the acidity of the resins or the viscosity of their solutions and likewise to make the resin compatible with nitrocellulose where the resin is to be used in lacquer compositions. The resinous ester complexes produced in accordance with this invention are normally soluble in such solvents, have low acidities and viscosities, and are compatible with nitrocellulose without the use of such modifying agents in their manufacture. The use of modifying agents to produce such characteristics in these resins is hence unnecessary for the purposes for which they have hitherto been employed. It is to be understood, however, that the use of modifying agents in the manufacture of these resinous ester complexes may be desirable and is in many cases highly advantageous in modifying the characteristics of the resinous body and mixtures thereof with nitrocellulose and other lacquer materials.

For example, by carrying out the process in the manner hereinbefore described, employing 168 parts of α-glyceryl phenyl ether, 148 parts of phthalic anhydride and 56 parts of castor oil, the product is a soft resin, lighter in color than the corresponding resin produced without the castor oil, but having similar solubilities.

The use of portions of a polyhydric alcohol such as glycerol in connection with the process of this invention for modification of the resinous ester complexes comprising this invention tends to produce insolubility of the final resinous bodies, higher acidity and viscosity thereof and will also tend to produce lessened compatibility with nitrocellulose, these effects increasing as the amount of glycerol is increased. Varying proportions of glycerol, say, from 10 to 50% of the amount of the glycerol ester employed, may be used for the production of less fusible or less soluble resin products.

It is likewise to be understood that the various expedients known to the art of resin manufacture are applicable to the present processes. For example, the condensations may be effected in an atmosphere of an inert gas; an inert gas may be blown through the resin during the condensation to hasten the removal of volatile products from the reaction mixture, or the condensations may be carried out at reduced or increased pressures. Further, the time and temperatures for effecting these reactions may vary within wide limits to produce substantially the same ultimate resinous products. The condensation of various glycerol ethers or the use of modifying agents may render such variations desirable or necessary.

In the manufacture of synthetic resins, as hitherto conducted, the resins pass through several stages of condensation and unless modifying agents are used in their syntheses the resins may have varying degrees of infusibility and insolubility. This transition from a fusible soluble condition to infusibility and insolubility is generally a rapid transition in which the properties of the resin change very rapidly during a short period of time. In certain ester types of synthetic resins complete esterification cannot be accomplished; gelation of the resins and rapid transition to infusibility and insolubility occurring at relatively high acidities of the resin. The use of modifying agents has therefore been resorted to in order to effect the esterification more completely and maintain solubility of the resin. Even then it is difficult to complete the esterification and approach neutrality in the resin unless such quantities of modifying agents are used as to adversely affect other desirable properties of the resin.

The resinous ester complexes produced in accordance with this invention are incapable of gelation within reasonable heating periods and the properties of the resinous products do not change materially during short, critical periods of heating, even near the end of the condensation, which is generally a critical period for other types of resins even when modifying agents have been used. For example, the viscosity of a toluene solution of the phenyl ether resin having acid number 25 is practically the same as that of a solution of the same resin with acid number 10. Because of these facts, it is possible to produce these resinous ester complexes with pronounced uniformity of properties from batch to batch.

The present invention provides new resinous complexes which overcome previous difficulties to a remarkable degree. It is possible, by the present invention, to produce hard resinous bodies substantially neutral in character, i. e., having acid numbers of 10 or less, which are soluble in a common organic solvents, and the solutions of which have comparatively low viscosities. These properties may be obtained without the use of modifying agents and without the hazards generally attendant on the manufacture of synthetic resins of soluble types.

These resinous ester-complexes, because of their inherent properties may be used advantageously as ingredients of protective films or coatings. They are well adapted to replace the natural resin constituents of present-day lacquers. They are much more durable than the natural resins normally used and produce less brittle films. Consequently in a nitrocellulose lacquer, for example, they may be used in a much higher ratio of resin to nitrocellulose than is possible with the natural resins, and the low viscosities of their solutions greatly facilitates the application of the composite lacquer products. They permit the formulation of lacquers having high solids content, and thereby reduce the number of coats of such a lacquer required to obtain the desired "build" in the dried films. The low acidities of the resins minimize the danger of "livering" in lacquers containing basic pigments. These resinous ester complexes therefore may not only replace naturally occurring resins advantageously in such compositions but likewise synthetic resins which have been available heretofore.

While particularly adapted to the protective coating field, resin bodies of the present invention may be used in other relations; for example, in the preparation of plastic masses, adhesives, or in other arts requiring fusible soluble types of resins.

I claim:

1. The method of producing resinous bodies which comprises reacting upon esterifiable ethers of glycerol and cyclic bodies with a polybasic carboxylic acid compound.

2. The method of producing resinous bodies which comprises reacting upon esterifiable ethers of glycerol and cyclic bodies with an anhydride of a polybasic carboxylic acid.

3. The method of producing resinous bodies which comprises reacting upon esterifiable ethers of glycerol and cyclic bodies with phthalic anhydride.

4. The method of producing resinous bodies which comprises heating an esterifiable ether of glycerol and a cyclic body with a polybasic carboxylic acid compound to effect reaction therebetween and produce a resinous body.

5. The method of producing resinous bodies which comprises heating an esterifiable ether of glycerol and a cyclic body with a polybasic carboxylic acid compound to effect reactions therebetween, and continuing the heating of the reaction mixture, thereby gradually changing the properties of the resinous body produced.

6. The method of producing resinous bodies which comprises heating an esterifiable ether of glycerol and a cyclic body with a polybasic carboxylic acid compound to effect reaction therebetween and produce a resinous body, and continuing the heating of the reaction mixture to reduce the acid number of the resinous body to not over 10.

7. The method of producing resinous bodies which comprises heating an esterifiable ether of glycerol and a cyclic body with phthalic anhydride to effect reaction therebetween and produce a resinous body, and continuing the heating of the reaction mixture, thereby effecting a gradual change in the properties of said resinous body.

8. The method of producing resinous bodies which comprises heating an esterifiable ether of glycerol and a cyclic body with phthalic anhydride to effect reaction therebetween and produce a resinous body, and continuing the heating of the reaction mixture to reduce the acid number thereof to not above 10.

9. The method of producing resinous bodies which comprises reacting upon a phenyl ether of glycerol with a polybasic carboxylic acid compound.

10. The method of producing a resinous body which comprises heating a phenyl ether of glycerol with phthalic anhydride.

11. The method of producing a resinous body which comprises heating a phenyl ether of glycerol with phthalic anhydride, thereby forming a resinous condensation product, and continuing the heating to gradually reduce the acid number of said resinous body.

12. The method of producing resinous bodies which comprises heating a tetrahydrofurfuryl ether of glycerol with a polybasic carboxylic acid compound.

13. The method of producing a resinous body which comprises heating a tetrahydrofurfuryl ether of glycerol with phthalic anhydride.

14. The method of producing a resinous body which comprises heating tetrahydrofurfuryl ether of glycerol with phthalic anhydride, thereby forming a resinous body, and continuing the heating to reduce the acid number of the resinous body to not more than 10.

15. A resinous condensation product of an esterifiable ether of glycerol and a cyclic body with a polybasic carboxylic acid.

16. A resinous condensation product of an esterifiable ether of glycerol and a cyclic body with a polybasic carboxylic acid, having an acid number of not more than 25.

17. A resinous condensation product of an esterifiable ether of glycerol and a cyclic body with a polybasic acid, having an acid number not exceeding 10 and which is soluble in lacquer solvent mixtures of esters, alcohols and hydrocarbons and is compatible with nitrocellulose.

18. A resinous condensation product of phenyl ether of glycerol and phthalic acid.

19. A resinous condensation product of phenyl ether of glycerol and phthalic acid, having an acid number not exceeding 10.

20. A resinous condensation product of tetrahydrofurfuryl ether of glycerol and phthalic acid.

21. A resinous condensation product of tetrahydrofurfuryl ether of glycerol and phthalic acid having an acid number not exceeding 10.

In testimony whereof I have hereunto set my hand this 9th day of May, 1930.

KENNETH H. HOOVER.